UNITED STATES PATENT OFFICE.

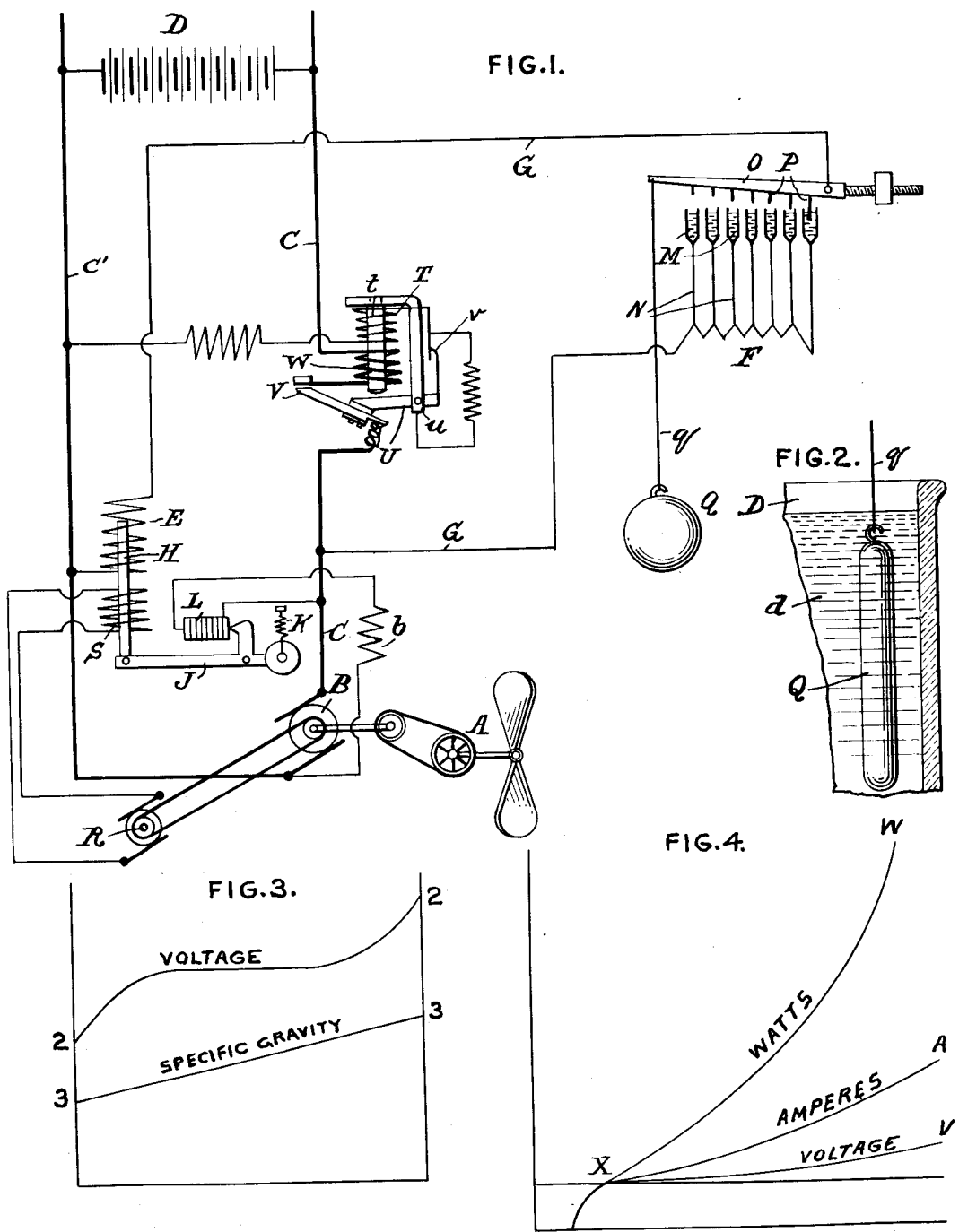

WILLIAM SNEE AND JOHN A. SNEE, JR., OF WEST ELIZABETH, PENNSYLVANIA.

ELECTRICAL REGULATION.

1,131,434.  Specification of Letters Patent.  Patented Mar. 9, 1915.

Application filed August 28, 1914. Serial No. 859,138.

*To all whom it may concern:*

Be it known that we, WILLIAM SNEE and JOHN A. SNEE, Jr., citizens of the United States, and residents of West Elizabeth, in the county of Allegheny and State of Pennsylvania, have invented certain new and useful Improvements in Electrical Regulation, of which the following is a specification.

This application is, in part, a continuation of our application Serial No. 792,426, filed September 29, 1913.

The invention herein relates to generator voltage regulation, and particularly to regulating voltage derived from a variable energy source, as a wind wheel, and one object is to utilize the state of charge of the battery for varying the generator voltage with the battery charge and thereby maintain a voltage relation between the generator and battery.

A further object is to utilize variable energy, derived from the energy source from which the generator is driven, for maintaining such varying relation between the generator load and the wind wheel that the latter is caused to always rotate at its most efficient speed for the wind prevailing at any given time, this variable energy control and the control effected by the state of charge of the battery coöperating in such manner as to maintain such relation between generator voltage, voltage of battery and speed and load of wind wheel as to secure maximum efficiency from all winds of sufficient power regardless of varying velocities.

While the variable energy for driving the generator may be derived from winds, tides, water currents, etc., the primary purpose is to so apply it to power derived from the wind that the wind wheel will run at its best efficiency in all wind velocities, the generator load being automatically controlled by the speed of the wheel, i. e., a force derived from the wind, and by the state of charge of the battery in such manner as to adapt the load to the wind velocity prevailing at any time.

It is well understood that a wind wheel converts a maximum amount of wind energy into mechanical power when the peripheral speed of the wheel is a certain fraction of the wind velocity, the fraction varying in wheels of different design, and with the load or output proportional to the cube of the wind velocity. We have demonstrated that the most efficient results are secured when the tip speed of the wheel is seven-tenths that of the wind velocity, and that departure either way from this velocity ratio impairs the efficiency of the wheel. But even though some different average speed ratio may be thought desirable, it is a purpose of the invention to maintain the most favorable speed ratio, whatever it may be, in winds varying widely in velocity so that the greatest efficiency is always attained, this being accomplished by utilizing the generated electro-motive force and the state of charge of the battery for maintaining such a favorable ratio.

An initial wind velocity is required for overcoming friction, excitation, etc., this requisite velocity varying slightly with variations in atmospheric humidity and density. When this necessary initial velocity has been attained the generator voltage should equal the battery voltage, no matter what the latter may be. As the voltage of the battery varies with its state of charge, such variations are utilized for varying the excitation of the generator.

If the described voltage relation between the generator and battery were not modified, the voltages would be the same at all speeds of the wheel and generator and no current would flow. Provision is therefore had for maintaining the generator voltage in excess of the battery voltage during all wheel velocities which are greater than that required to establish the initial relation, such excess voltage varying with the wind velocity and being sufficient to induce such a flow of current from generator to battery that the wheel is never overloaded or underloaded.

Apparatus for practicing the invention is illustrated diagrammatically in Fig. 1 of the accompanying drawings. Fig. 2 is a detail of a portion of the storage battery. Fig. 3 is a diagram illustrating variations in the battery voltage and in the specific gravity of the electrolyte. Fig. 4 is a diagram in which the generator output is plotted against windmill speed.

In the present illustration, the variable power is derived from a wind wheel A geared to an electric generator B.

C and C' are the generator leads to an external circuit, and arranged in series with such circuit is an accumulator D. The latter may consist of a single storage battery or several batteries so connected as to be equivalent of a single battery.

For controlling the voltage two resistance devices E and F are included in the shunt G across the battery leads. Coil E constitutes the helix of a solenoid, the core H of which is connected to one end of lever J. This lever is adapted to be actuated by a spring K to compress a carbon pile resistance L in the shunt field winding $b$ of generator B and the solenoid counteracts this spring under operating conditions presently to be described.

The series resistance F is of step form with a series of mercury cups M connected to different portions thereof by wires N. Included in shunt G is the counterweighted lever O from which project the contacts P, one for each cup M. Normally, the contact nearest the lever fulcrum closes the circuit through the mercury cup that directs the current through the whole length of resistance F. As the lever lowers and other contacts are entered in their cups corresponding portions of the resistance are eliminated.

The state of charge of the battery is utilized for thus varying the resistance of the voltage controller, in the adaptation here shown the specific gravity of the liquid element $d$ of storage battery D being utilized by means of a hydrometer Q for oscillating lever O, being connected thereto by wire $q$. As the specific gravity of liquid $d$ decreases with the depletion of the battery the resulting lowering of the hydrometer diminishes the effectiveness of resistance F.

As the battery charge becomes depleted the resulting depression of the hydrometer decreases the resistance in series with coil E, and the resulting increased current flow through the latter operates to raise core H against the pull of spring K and correspondingly decreases the compression of carbon pile L. This decreases the current flow through generator field $b$ and correspondingly lowers the voltage. As the battery voltage increases the upward movement of the hydrometer restores the resistance of coil F in series with coil E, correspondingly releasing core H to the pull of spring K, thereby increasing the carbon pile compression, and the resulting decreased resistance in the field winding causes an increased voltage. The action of the hydrometer in raising and lowering is to cause the resistance F in series with coil E to be so varied that the generator voltage is always equal to that of the battery voltage when the generator has attained a predetermined minimum speed. This is accomplished by having the resistance F so subdivided and the successive contact P on lever O adjusted to coöperate with their mercury cups at such times as to cause the generator voltage to conform to the battery voltage. In the diagram, Fig. 3, illustrating variations in battery voltage and specific gravity of the electrolyte during charge, the battery voltage is indicated by the curve 2—2. Variations in specific gravity are indicated by the line 3—3. As the greatest variations in voltage occur during the first and last portions of the charge it follows that resistance F must so operate that its greatest variations take place during those periods. By utilizing the gravity of the electrolyte for regulating the voltage of the generator, the regulating means are not affected by variations of charging voltage or current as would be the case if electrically operated.

The speed of the generator (or wind wheel) is utilized for so altering the voltage relation between the generator and battery as to induce a current flow into the battery. In the adaptation here illustrated a small supplemental generator R is geared to the main generator, and the current therefrom flows through a coil S wound on the spool which carries coil E and opposes the latter in such manner as to create the desired slight voltage difference in favor of the generator. The current output of generator R, while very small, varies in proportion to the power of the wind, so that as the mill speeds up the counteracting effect on coil E permits spring K to predominate sufficiently to cause the desired additional excitation of the generator field.

As the increase and decrease of the output of generator B, and hence the increase and decrease of the wind wheel load, is determined at least in part by the speed— faster or slower—of generator R, and as the latter is geared to the wind wheel and its speed is determined thereby, variations in the output of generator B will approximate a fixed relation to speed variations of the wheel resulting from variations in wind velocity. Variations in wheel speed cause variations in the output of generator R, which in turn cause variations in the output of generator B in approximate conformity with that characteristic of the wheel speed which varies its load proportionally to the cube of the wind velocity. Having ascertained the most advantageous ratio of wheel speed to wind velocity, and the maximum efficient output of generator B for all wind velocities and wheel speeds generator R is so adjusted and utilized in connection with coil S that the effect on the constant-voltage regulating tendency of coil E will be to increase the voltage of generator R with increasing wheel speeds sufficiently to cause the load, $i.\ e.$, the output of generator B plus friction and other losses, to conform to the available power of the wheel in winds of varying velocities. The output of generator R having been adjusted to conform to the available power for different wheel speeds, it is so adjusted for any one speed that its retarding effect on the wheel causes the latter to operate at its maximum efficiency, and any increase or decrease of wind velocity results in a proportionate increase or decrease in the output of generator R, but the efficient relation remains substantially unchanged.

The diagram, Fig. 4, shows generator output plotted against windmill speeds. X is the point on the load curve denoting equality of generator and battery voltages, which point is attained after frictional and excitation losses have been overcome. When generator voltage equals the battery counter E. M. F., which latter is given the value X in the diagram Fig. 4, then useful work begins. For a given generator speed, say 600 R. P. M., after the generator has supplied energy sufficient for excitation and other electrical losses it has attained a voltage equal to the battery voltage no matter what the latter, within operating limits, may be. When the generator speed increases, due to added wind impulse, auxiliary generator R energizes coil S, counteracting the effect of coil E, releasing lever J to the pull of spring K, compressing the carbon pile L, and correspondingly raising the voltage of generator B in conformity with curve X—V. By reason of this increased voltage, current is caused to flow from the generator through the battery as shown by curve X—A which denotes the amperes. The products of the ordinates of the curves X—V and X—A produce the curve X—W which represents the maximum output in watts of the windmill.

To prevent the battery from discharging through the generator when the variable power prime mover stops, or when its speed is lower than will hold the generator voltage up to the battery voltage, an automatic switch is provided between the battery and generator which closes only when a generator voltage of sufficient strength has been attained. The switch may be variously embodied. As here shown, it consists of a shunt coil T connected directly across the battery leads through armature U pivoted at $u$, the switch circuit being closed through contact $v$ when the switch is open, and the main circuit being closed through contact V when the generator potential is sufficient to energize magnet core $t$ of coil T and attract the armature U thereto. A series coil W in the battery lead is wound on the spool with coil T, and operates to maintain magnet core $t$ energized after the switch has been closed and so long as the battery voltage does not exceed the generator voltage. But when the generator voltage drops below the battery voltage coil T operates to deenergize series coil W and the switch drops open by gravity and remains open until there is sufficient generator voltage to close it.

No novelty is claimed herein for the several mechanical and electrical devices employed, excepting as they or their equivalents are arranged or organized in a voltage-controlling system, and hence it will be understood that the several devices may be variously constructed and embodied without departing from the invention.

While the invention is disclosed with special reference to its application to wind power, it will be understood that the underlying principles may be utilized for obtaining maximum efficiency from other sources of variable power.

We claim:

1. The method herein described consisting in driving an electric generator by means of a wind wheel, utilizing the generated current for maintaining a predetermined relation between the generator load and the speed of the wind wheel, and utilizing the variations of the speed of the wheel for varying the load in conformity with wheel speed variations as described.

2. The method herein described consisting in driving an electric generator by means of a wind wheel, utilizing the generated electro-motive force for tending to maintain the potential of the generator substantially constant for all speeds of the latter above a given minimum, utilizing a force derived from the wind as the speed of the wheel increases for raising the generator potential, and so proportioning the said regulating forces as to cause the wheel to run substantially at a predetermined fraction of the wind velocity.

3. The method herein described consisting in charging a storage battery by means of a generator driven by a wind wheel, and governing the voltage of the generator by the conjoint action of the state of charge of the battery and the varying of the wind.

4. The method herein described consisting in charging a storage battery by means of a generator driven by a wind wheel, utilizing the generated electro-motive force and the state of charge of the battery and the intensity of the force derived from the wind for adapting the generator load to the speed of the wheel, and utilizing the state of charge of the battery for determining the approximate wind velocity at which current begins to flow.

5. The method herein described consisting in delivering to a circuit in series with a storage battery electrical energy from a generator driven by variable power, utilizing the state of charge of the battery for causing the generator potential to equal the battery potential whenever the generator runs at a given velocity, and utilizing the variable power for raising the generator potential as the speed of the generator exceeds such given velocity.

6. The method herein described consisting in delivering to a circuit in series with a storage battery electrical energy from a generator driven by a wind wheel, utilizing the state of charge of the battery for causing the generator potential to equal the battery potential whenever the generator runs at a given velocity, and utilizing the velocity of the wind for maintaining a substantially constant relation between the work performed by the wheel and the available variable energy of the wind.

7. The combination of a main electric generator, a wind wheel for driving the generator, an electric circuit in series with a storage battery adapted to be charged from the generator, means actuated by the state of charge of the battery for equating the generator voltage to the battery voltage at a given wind wheel velocity, an auxiliary electric generator, and means actuated by the electro-motive force of the auxiliary generator for adapting the main generator load to the speed of the wind wheel.

8. The combination of an electric generator, a battery adapted to be charged therefrom, a wind wheel for driving the generator, variable controlling means operatively connected to the battery and actuated by the state of charge thereof, variable wind-actuated controlling means, and means actuated by the conjoint action of said two variable controlling means for controlling the voltage impressed upon the battery.

9. The combination of an electric generator having an electro-magnetic field, a wind wheel for driving the generator, a battery adapted to be charged from the generator, and means actuated by the state of charge of the battery for varying the resistance of the generator field.

10. The combination of an electric generator having an electro-magnetic field, a wind wheel for driving the generator, a battery adapted to be charged from the generator, and wind actuated means for varying the resistance of the generator field.

11. The combination of an electric generator having an electro-magnetic field, a wind wheel for driving the generator, a battery adapted to be charged from the generator, and two conjointly acting means for varying the resistance of the generator field—one actuated by the state of charge of the battery and the other means actuated by force derived from the wind.

12. The combination of an electric generator having an electro-magnetic field, a wind wheel for driving the generator, a battery adapted to be charged from the generator, means actuated by the state of charge of the battery for varying the resistance of the generator field, and wind actuated means operatively connected to the means which is actuated by the state of charge of the battery for opposing the effectiveness of the state-of-charge means.

13. The combination of an electric generator having an electro-magnetic field, a variable resistance in the generator field, means actuated by the state of charge of the battery for varying said resistance, and wind actuated means for opposing the resistance-varying action of the battery state-of-charge means.

In testimony whereof we affix our signatures in presence of two witnesses.

WILLIAM SNEE.
JOHN A. SNEE, Jr.

Witnesses:
J. OLIVER PERCIVAL,
F. J. KERRIGAN.